United States Patent [19]

Sugishima

[11] Patent Number: 5,075,785
[45] Date of Patent: Dec. 24, 1991

[54] IMAGE PROCESSING APPARATUS

[75] Inventor: Kiyohisa Sugishima, Yokohama, Japan

[73] Assignee: Canon Kabushiki Kaisha, Tokyo, Japan

[21] Appl. No.: 453,114

[22] Filed: Dec. 22, 1989

Related U.S. Application Data

[63] Continuation of Ser. No. 162,563, Mar. 1, 1988, abandoned.

[30] Foreign Application Priority Data

Mar. 3, 1987 [JP] Japan .................................. 62-47964

[51] Int. Cl.$^5$ .............................................. H04N 1/40
[52] U.S. Cl. .................................... 358/448; 358/296
[58] Field of Search .................. 340/727, 735; 382/45, 382/46; 358/296, 443, 444, 445, 448, 450, 451, 452, 453

[56] References Cited

U.S. PATENT DOCUMENTS

| | | | |
|---|---|---|---|
| 4,520,399 | 5/1985 | Iida | 358/280 |
| 4,538,183 | 8/1985 | Kanno et al. | 358/287 |
| 4,667,248 | 5/1987 | Kanno | 358/280 |
| 4,672,462 | 6/1987 | Yamada | 382/45 |
| 4,706,205 | 11/1987 | Akai et al. | 382/44 |
| 4,736,442 | 4/1988 | Kornfeld | 340/727 |
| 4,739,350 | 4/1988 | Arao | 346/160 |
| 4,807,044 | 2/1989 | Kikuchi | 358/280 |

Primary Examiner—Edward L. Coles, Sr.
Assistant Examiner—Jerome Grant
Attorney, Agent, or Firm—Fitzpatrick, Cella, Harper & Scinto

[57] ABSTRACT

An image processing apparatus includes a reader for photoelectrically reading an original image, and outputting an image signal, an editor for converting the image signal representing a partial image of the original output from the reader into an image signal representing a mirror image of the partial image, and a printer for recording the mirror image at an arbitrary position on a recording medium based on the image signal representing the mirror image from the editor.

9 Claims, 10 Drawing Sheets

IMAGE PROCESSING APPARATUS

This application is a continuation of application Ser. No. 07/162,563 filed Mar. 1, 1988, now abandoned.

BACKGROUND OF THE INVENTION

1. Field of the Invention

The present invention relates to an image processing apparatus for processing an original image.

2. Related Background Arts

A digital copying machine is proposed, which reads an original image and performs image recording on a recording medium based on an image signal obtained by reading.

Such a digital copying machine electrically processes an image, and can easily execute various processing functions. However, in a conventional copying machine, a large-capacity memory such as a page memory is arranged, and all the images stored in the memory are accessed by a computer unit to achieve the various processing functions. Therefore, the size of a processing circuit is increased, and its cost is increased. In addition, a person who is not accustomed to operation of such a machine cannot sufficiently use these functions.

The present applicant proposed an image processing apparatus capable of executing various processing functions by simple procedures using a small-capacity memory (for several lines) in the U.S. patent applications Ser. Nos. 840,980/1986 filed on Mar. 13, 1986, 945,897/1986 filed on Dec. 24, 1986 and the like.

However, the techniques disclosed in these applications cannot cope with complex processing combining various processing functions, and cannot meet many demands of users of the digital copying machine.

SUMMARY OF THE INVENTION

The present invention has been made in consideration of the above situation and has as its object to provide a simple image processing apparatus capable of various image processing functions by a simple operation.

It is another object of the present invention to provide an image processing apparatus capable of recording a mirror image of an arbitrary partial image of an original image on an arbitrary position of a recording medium.

It is still another object of the present invention to provide an image processing apparatus capable of recording both an arbitrary partial image of an original image and its mirror image on an identical recording medium.

It is still another object of the present invention to provide an image processing apparatus capable of recording a plurality of arbitrary partial images of an original image on an identical recording medium in an arrangement different from that on the original.

It is still another object of the present invention to provide an image processing apparatus capable of recording at least one mirror image of a plurality of arbitrary partial images of an original image and other partial images on an identical recording medium.

The above and other objects and effects of the present invention will become apparent from the following description.

BRIEF DESCRIPTION OF THE DRAWINGS

FIGS. 6(1)-6(7) are views showing various image processing examples;

DETAILED DESCRIPTION OF THE PREFERRED EMBODIMENT

A preferred embodiment of the present invention will be described hereinafter.

Figure 1:
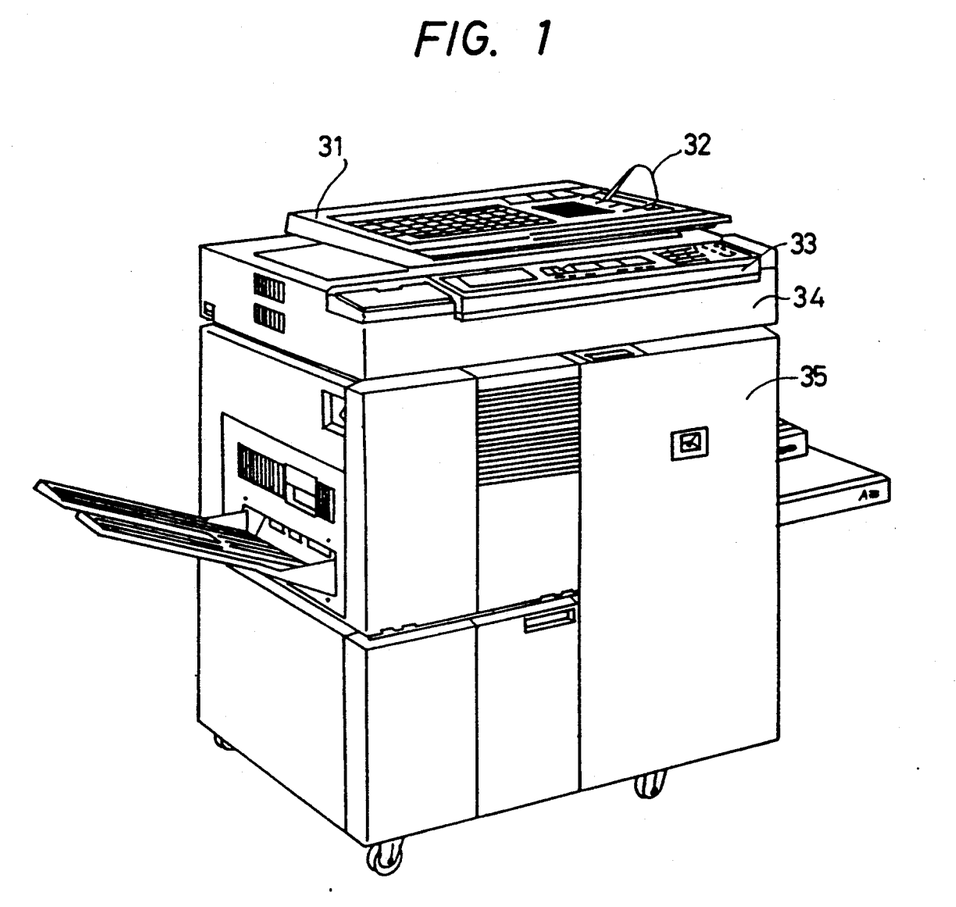
FIG. 1 is a perspective view showing an outer appearance of a copying machine to which the present invention is applied.

FIG. 1 is a perspective view showing a copying machine to which the present invention is applied. The copying machine shown in FIG. 1 includes an editor 31 provided on an upper surface of an original cover and used for inputting points and setting modes, a touch pen 32 used for point input on the editor 31, an operation unit 33 for setting various modes, a reader 34 for reading an original, and a printer 35 for outputting an image read by the reader 34.

Figure 2:
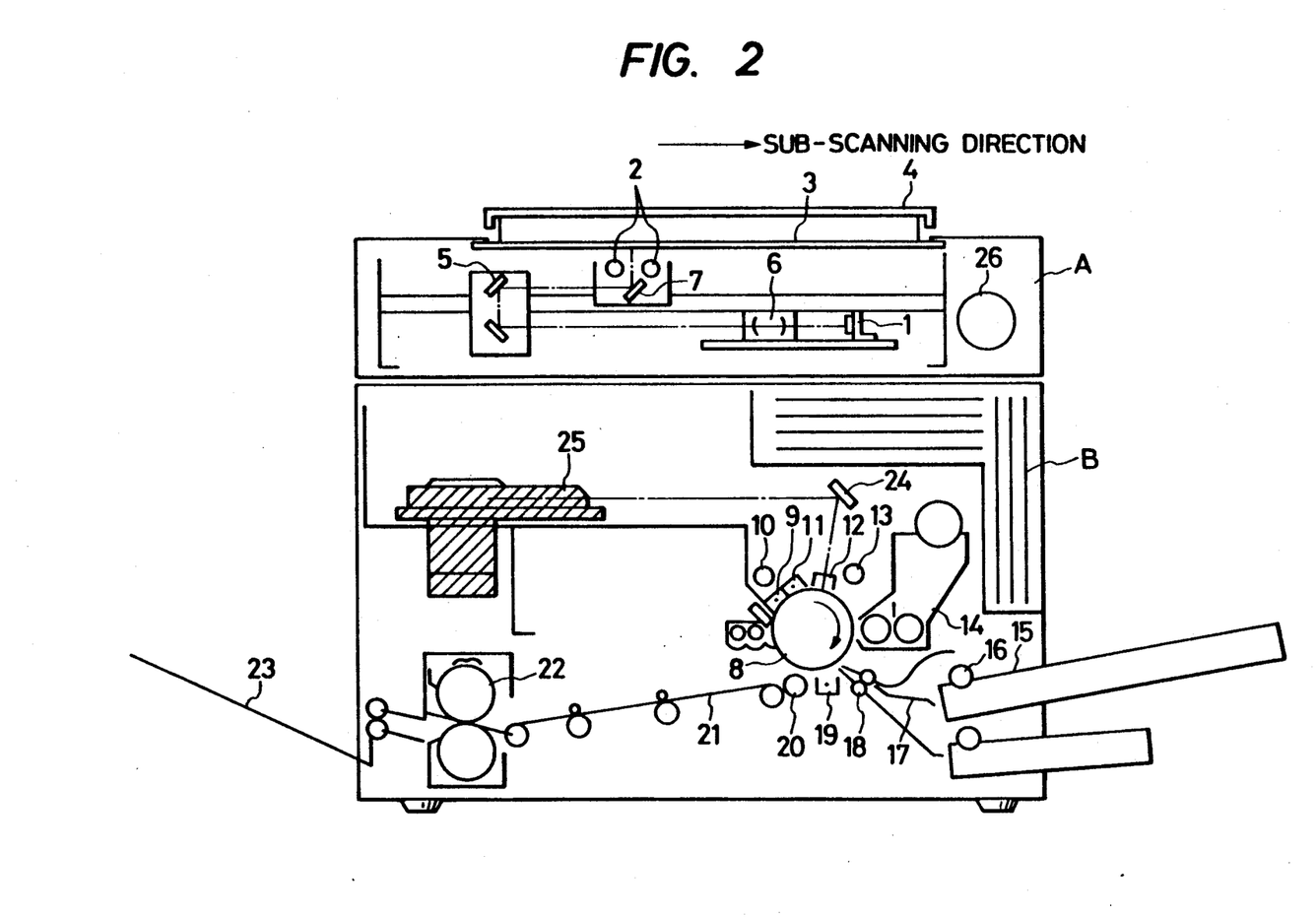
FIG. 2 is a view showing an internal arrangement of the copying machine.

FIG. 2 shows the structure of the reader and the printer. An original is placed facing down on an original table glass 3, and is urged against the glass by an original cover 4 comprising the editor 31. The original is illuminated by a fluorescent lamp 2, and light reflected by the original is focused on the surface of a CCD 1 through mirrors 5 and 7 and a lens 6.

The mirrors 7 and 5 are moved at a relative speed ratio of 2:1. The optical system is moved forward (from the left to right) at a speed according to a read magnification while being subjected to PLL control by a DC servo motor 26.

Backward movement (from the right to left) of the optical system is performed at a constant speed regardless of the magnification. A maximum original size to be processed is an A4 size, and a resolution is 400 dots-/inch. The CCD 1 thus comprises a linear image sensor of about 5,000 bits.

In this manner, the mirrors 5 and 7 are moved to move an original reading position, and an original image is scanned by the CCD 1 in a line sequential manner to obtain an image signal representing an image density.

An image signal which is processed by a reader A in a bit-serial manner is input to a laser scanning optical system unit 25 of a printer B. The unit 25 comprises a semiconductor laser collimator lens, a rotational polygonal mirror, an F$\Theta$ lens, and an inclination compensation optical system.

The image signal from the reader A is applied to the semiconductor laser to be electro-optically converted. The converted light is radiated, through the collimator lens, on the polygonal mirror which is rotated at high speed, and the light reflected by the mirror is incident on and scans a drum-like photosensitive body 8 which is rotated at a predetermined speed. Process components for allowing image formation on the photosensitive body 8 are a predischarger 9, a predischarging lamp 10, a primary charger 11, a secondary charger 12, a front-surface exposure lamp 13, a developer 14, a paper-feed cassette 15, a paper-feed roller 16, a paper guide 17, register rollers 18, a transfer charger 19, a separation roller 20, a transfer guide 21, a fixing device 22, and a tray 23. The speed of the photosensitive body 8 and the convey system is 180 mm/sec. The printer B is a so-called laser printer. Note that a photosensor (not shown) for detecting scanned laser light is arranged near the photosensitive body 8, and a main-scan start signal BD is formed based on the output from the photosensor.

The copying machine of this embodiment has intelligence such as image editing, and has a variable magnification function for setting an arbitrary magnification in units of 1% within the range of 35% to 400%, a trimming function for extracting an image of a designated region, a moving function for moving the trimmed image to an arbitrary position on a sheet, and the like.

Figure 3:
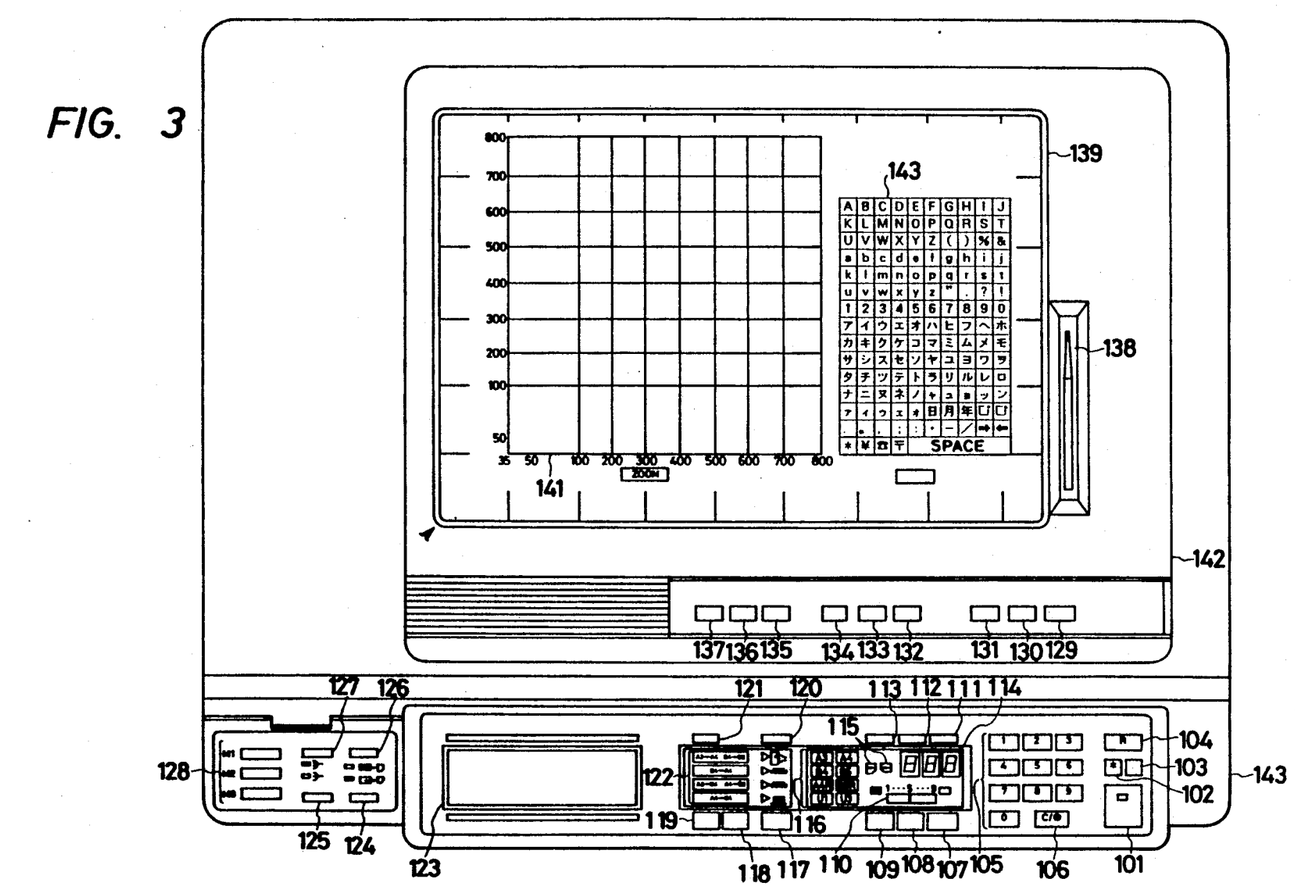
FIG. 3 is a view showing an operation unit of a reader.

FIG. 3 shows an outer appearance of the reader viewed from the above.

The reader is provided with an original cover 142 having an operation section 143 and the editor 31.

These sections will be described below. The operation section 143 is connected to the reader, and displays information of the printer which performs image formation based on image information.

A start key 101 designates a start of original scanning.

An asterisk key 102 is used to set a service mode.

A recall key 103 is used to designate a recall mode wherein the previous copying mode can be recalled. A reset key 104 is used to reset various set data to a standard mode. Ten keys 105 are used to set a copy count.

A clear/stop key 106 is used to clear the copy count set by the ten keys and to stop the copying operation.

Density keys 107, 108, and 109 are used for designating manual density adjustment or automatic density adjustment (AE) mode of a copy, and the designated mode is indicated on an indicator 110.

A photograph key 111 is depressed when a photograph original is to be copied. A high-contrast key 112 is depressed when a copy having a high contrast (black and white) image is to be obtained. A negative/positive inverting key 113 is depressed when a copy in which black and white levels of an image are inverted is to be obtained.

A count display 114 displays the copy count set by the ten keys 105 and the remaining count during the copying operation. Indicators 115 indicate a direction of an original to be placed in accordance with a copying magnification and a paper size. Indicators 116 indicate a selected paper size. A cassette selection key 117 designates a paper-feed cassette of the printer. An equal magnification key 118, a preset variable magnification key 119, and an auto variable magnification key 121 are used to designate a magnification of a variable magnification copy, and indicators 122 indicate a magnification in the preset variable magnification mode.

An auto paper selection key 120 is used when a paper size is automatically selected in accordance with an original size, and the like. A liquid crystal display 123 comprises a 240×64 (dot) liquid crystal display unit, and performs a display under the control of a microcomputer (to be described later).

The surface of the liquid crystal display 123 is covered by a transparent touch panel.

The touch panel incorporates 4×10 matrix transparent electrode switches. When the switch is designated by a finger or the like, the designated coordinate position is fetched by the microcomputer (to be described later) to detect the designated position. A double-side/multiple key 124 is used for designating a double-side or multiple copying mode of the printer. A sort/collate key 125 is used for designating an operation of a sorter which is connected to the printer and sorts paper sheets. A center moving key 126 is used when image information is moved to the center of a paper sheet. An original confirmation key 127 is used to select whether or not an original size or position is to be recognized.

A memory key 128 is used to store various operation modes and to simultaneously call the stored modes.

The original cover 142 urges an original on the original table (not shown) and has the operation section. The original cover 142 allows an operator to set various copying modes and to input characters, numerals, symbols, and the like.

A digitizer 139 can fetch coordinate data on the board surface designated by the touch pen 138 into the microcomputer. The coordinate data is recognized as position information or magnification information from 35% to 800% on an original from a coordinate magnification input surface 141, and character information from a character input surface 143.

Note that the magnification information is obtained by converting coordinates in accordance with a program of the microcomputer. Therefore, as shown in FIG. 3, a necessary magnification range can be enlarged (in this embodiment a magnification range of 35% to 100% is enlarged).

A zoom key 129 is used to designate a magnification. After the key 129 is depressed, a desired coordinate position of the coordinate magnification input surface 141 is indicated by the touch pen 138, thereby designating a magnification.

An area designation key 130 is used to designate an area where image processing is performed. After the key 130 is depressed, a desired position on an original placed on the coordinate magnification input surface 141 is designated by the touch pen 138, thus designating an arbitrary area.

A move key 131 is used for moving an image. After the key 131 is depressed, a position to which an image is to be moved on the coordinate magnification input surface 141 is designated by the touch pen 138 or by the touch panel 123.

A page continuous-copying key 132 is used when an original is divisionally output on a plurality of paper sheets.

An enlargement continuous-copying key 133 is used when an enlarged image of an original is divisionally output on a plurality of paper sheets.

A mirror image key 136 is used when an original image is inverted along a main scan direction.

A folding key 137 is used when an original image is copied as an image which is line-symmetrical about a desired position along the main scan direction.

A character input key 134 is used when characters, numerals, symbols, and the like are inserted and recorded on an original image. After the key 134 is depressed, the character input surface 143 is designated by the touch pen 138 to designate desired characters, numerals, or symbols.

An image repeat key 135 is used when the entire image or a trimmed image is repetitively recorded several times on an identical recording medium.

Figure 4:
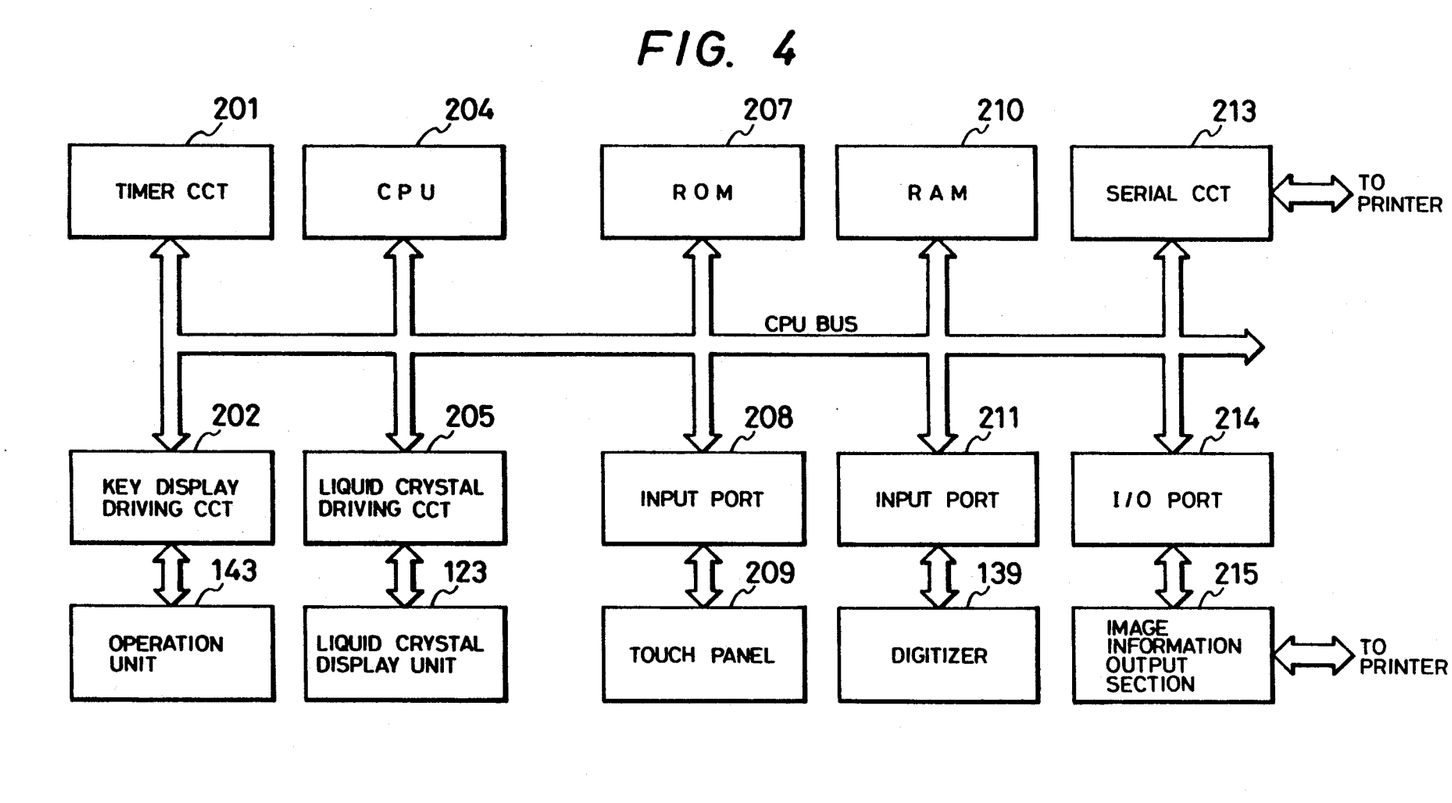
FIG. 4 is a block diagram of a control unit of the reader.

FIG. 4 shows an arrangement of a control circuit of the reader. The control circuit will be described below.

A CPU 204 is operated in accordance with a control program written in a ROM 207, and controls the entire reader using a RAM 210, an I/O port 214, a timer circuit 201, a serial circuit 213, a key display driving circuit 202, a liquid crystal driving circuit 205, and input ports 208 and 211.

The key display driving circuit 202 is adopted to scan a key matrix of the operation section 143 and to drive indicators such as LEDs.

The liquid crystal driving circuit 205 is a control circuit for causing the liquid crystal display 123 to display various kinds of information.

The input port 208 is a port for inputting coordinates on a touch panel 209 of the liquid crystal display 123.

The input port 211 is a port for inputting coordinates on the digitizer 139.

The I/O port 214 is a port for controlling respective portions (original illumination fluorescent lamp, an optical system drive motor, and the like) of an image information output section 215 for reading an original image and outputting image information.

The serial circuit 213 is used to supply a control instruction to the printer and the like, and receives information therefrom.

Figure 5:
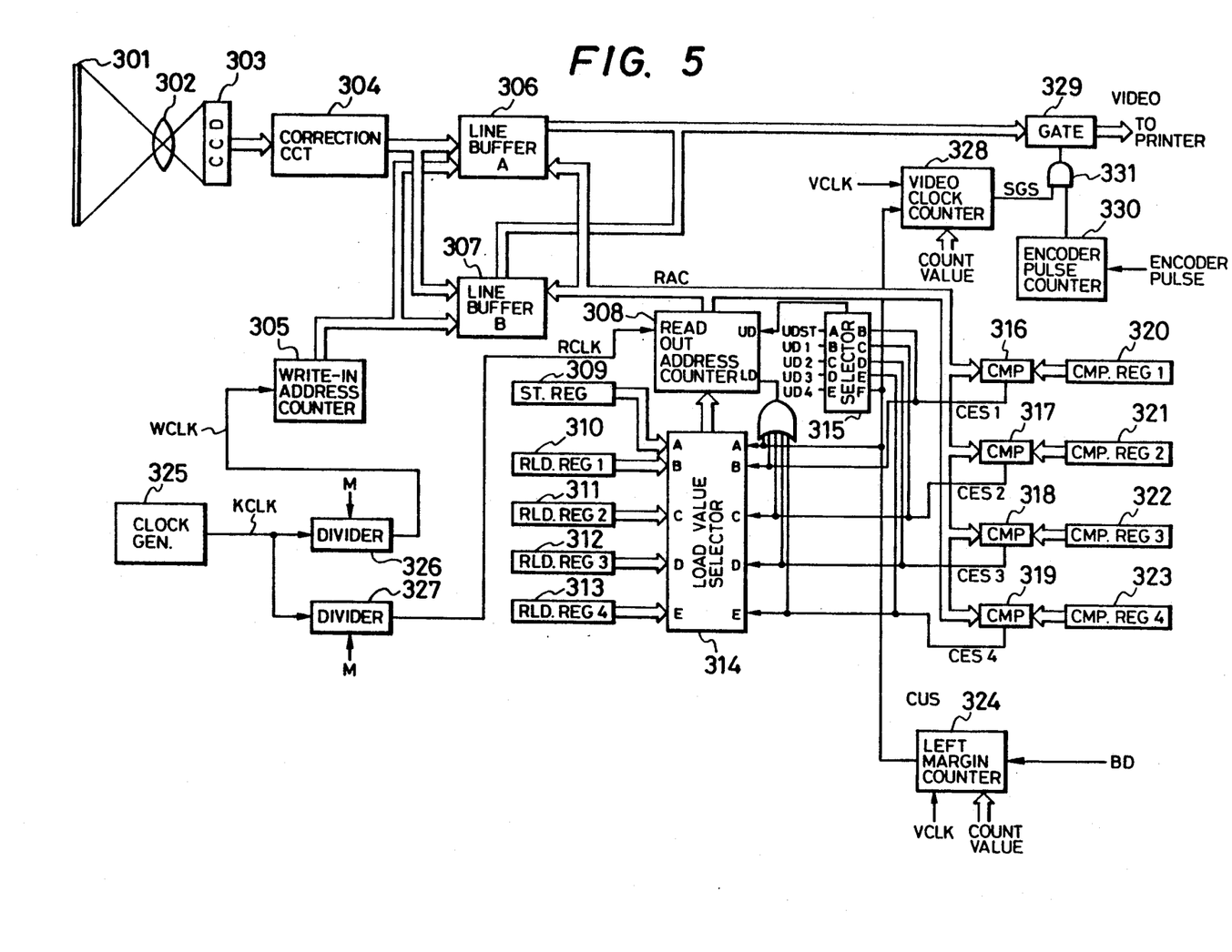
FIG. 5 is a block diagram of an image signal processing unit of the reader.
Figure 6:
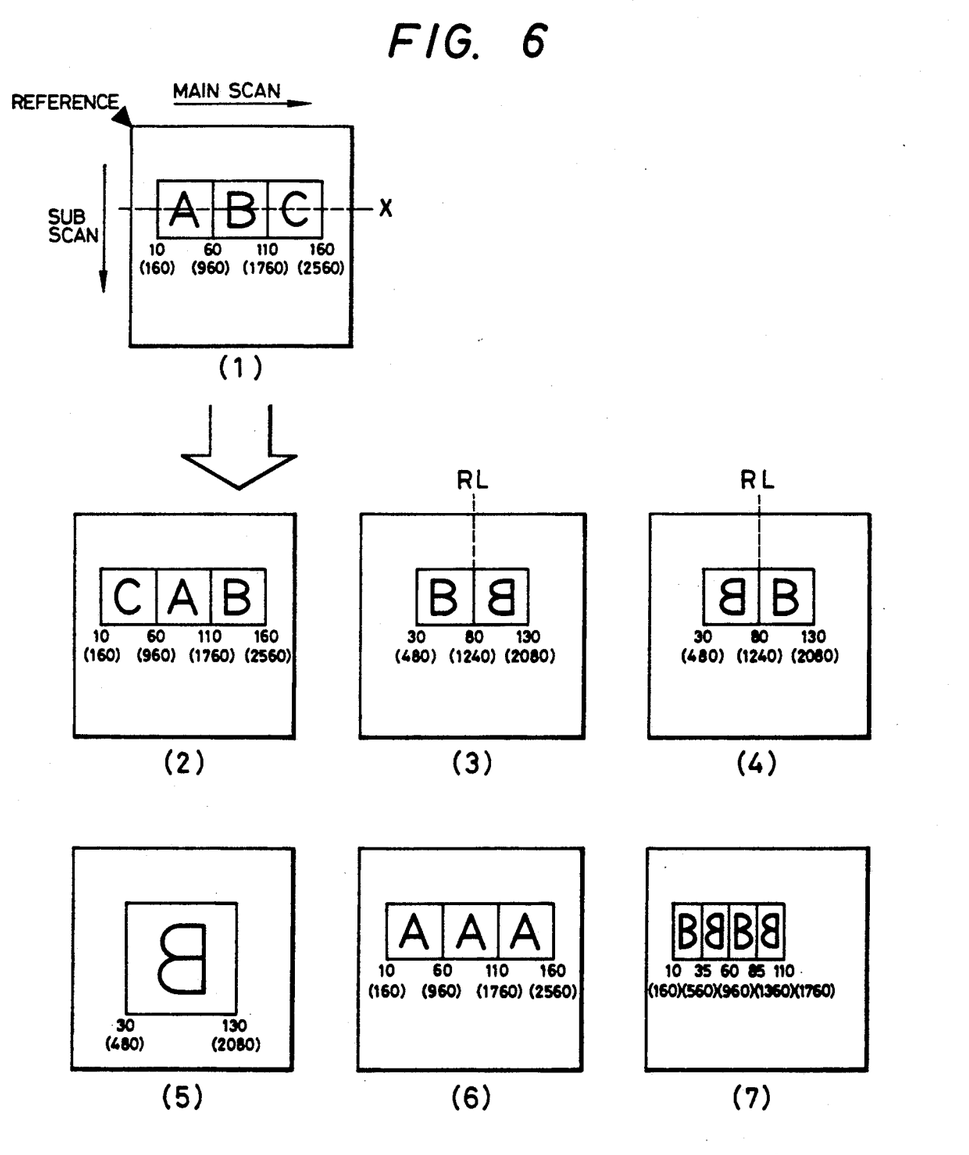

FIG. 5 shows a schematic arrangement of the image information output section 215 of the reader of this embodiment. The section 215 will be described below.

Light reflected by an original 301 illuminated with the fluorescent lamp 2 is incident on a charge coupled device (CCD) 303 through a lens 302. The original image incident on the CCD 303 is converted to an image signal indicating an image density in units of pixels. The image signal is input to a line buffer A 306 or B 307 through a correction circuit 304 which performs A/D conversion, shading correction, and the like.

The digital image signal is alternately written in the line buffer A or B in units of lines in accordance with addresses from a write-in address counter 305. The address counter 305 is controlled by a write clock WCLK.

In an enlargement read mode, the write clock WCLK has the same period as in an equal-magnification read mode, and a read clock RCLK (to be described later) has a period longer than that in the equal-magnification read mode. In a reduction read mode, the write clock WCLK has a period longer than that in the equal-magnification read mode, and the read clock RCLK has the same period as in the equal-magnification read mode. The periods of these clocks are determined by a variable magnification, and are respectively formed by frequency-dividing a reference clock KCLK generated by a clock generator 325 by frequency dividers 326 and 327.

The digital image signal written in the line buffer A 306 or B 307 is read out in accordance with an address RAC output from a read out address counter 308, and is output to the printer. The read out address counter 308 increments its address count in response to the read clock RCLK generated using the clock generator 325 and the frequency divider 327. The address counter 308 performs up or down count in response to an up/down signal U/D.

The address data RAC output from the read out address counter 308 is input to the line buffers A 306 and B 307, and is also supplied to comparators 316 to 319.

The comparators 316 to 319 always compare the contents of comparison data registers 320 to 323 storing four types of data designated by the CPU 204 with the address data from the address counter 308. When a coincidence is detected therebetween, the comparators 316 to 319 generate coincidence signals CES1 to CES4. These coincidence signals CES1 to CES4 are input to a load value selector 314 and a selector 315 as select signals.

The load value selector 314 is connected to registers 309 to 313 for respectively storing a start value and three types of load values designated by the CPU 204. The load value selector 314 selects one of the contents of the registers 309 to 313 in accordance with one of the coincidence signals CES1 to CES4 from the comparators 316 to 319 and a count-up signal CUS output from a left margin counter 324. The selected value is loaded to the read out address counter 308.

The selector 315 selects one of up/down designation signals UD-ST and UD1 to UD4 designated from CPU 204 in accordance with one of the coincidence signals CES1 to CES4 from the comparators 316 to 319 and the count-up signal CUS from the left margin counter 324 in the same manner as in the load value selector 314, and supplies the selected value to the read out address counter 308.

The left margin counter 324 receives a BD signal as a start signal in the main scan direction from the printer, and outputs the count-up signal CUS after the count operation of a predetermined count is completed from the input of the signal. The count value of the left margin counter 324 can be changed by the CPU 204, and a change in count value realizes movement of an image in the main scan direction.

A video clock counter 328 counts video clocks VCLK for one line in response to the output of the count-up signal CUS of the left margin counter 324, and then supplies a gate signal SGS to an AND gate 331. The gate signal SGS serves to pass an image signal in the main scan direction. The gate signal SGS and a gate circuit 329 control an output interval of an image signal in the main scan direction to the printer. The CPU 204 sets a count value corresponding to an effective length for one line of an image in the video clock counter 328.

A motor is used to move the optical system (the mirrors 5 and 7, and the fluorescent lamp 2) in the sub scan direction. An encoder for generating pulses in accordance with rotation of the motor is attached to the motor, and the number of pulses is counted to measure a moving distance of the optical system in the sub scan direction.

An encoder pulse counter 330 counts pulses synchronous with the movement of the optical system. The counter 330 outputs an enable signal to an AND gate 331 in accordance with the count value, thereby controlling an output interval of an image in the sub scan direction. Note that the count value of the encoder pulse counter 330 is appropriately set and read out by the CPU 204.

FIG. 6 shows image processing examples. For the sake of simplicity, one main scan line has a length of 20 cm, and is read at a rate of 16 pixels/mm.

FIG. 6(1) shows an original, and FIGS. 6(2) to 6(7) show print results after image processing. The horizontal direction corresponds to the main scan line parallel-input to the CCD for one line, and the vertical direction corresponds to the sub scan direction along which the optical system moves. Note that movement of a reading position along the sub scan direction is executed by moving the optical system by the motor, and a moving distance of the optical system is measured by counting the number of pulses by the encoder attached to the motor. An operator designates areas of images A, B, C of the original in FIG. 6(1) and print positions of the images using the digitizer 139. Note that in FIGS. 6(1) to 6(7), numerals "10", "60", "110", and the like represent lengths (mm) from a reference point in the main scan direction, and numerals in parentheses represent pixel positions.

In the print result shown in FIG. 6(2), the order of images A, B, and C of the original shown in FIG. 6(1) is changed. More specifically, the images arranged in the order of A, B, and C are recorded in the order of C, A, and B.

Figure 7:
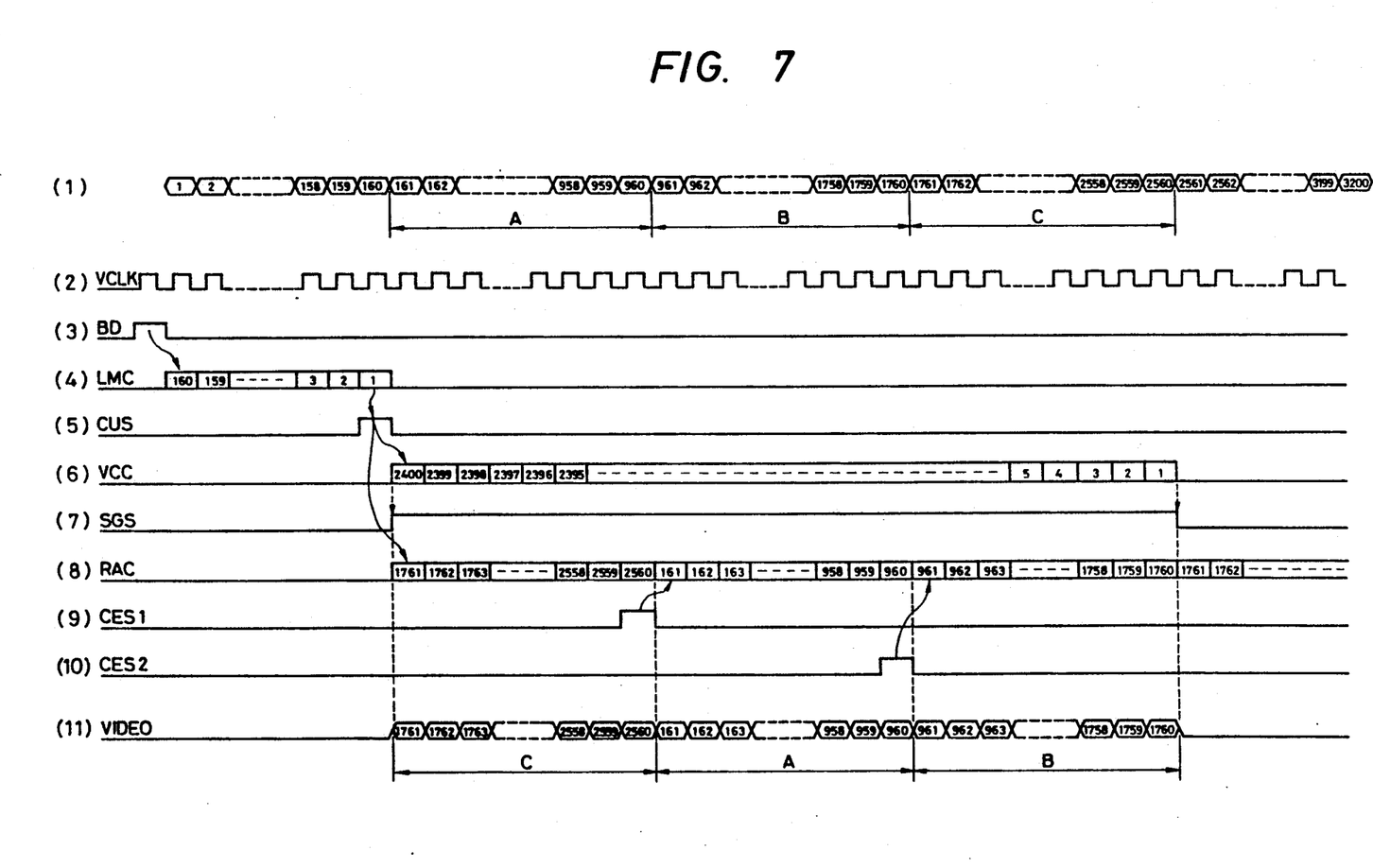
FIGS. 7 and 8 are timing charts showing processing signals.

FIG. 7 shows the operations of the circuit shown in FIG. 5 when the print result shown in FIG. 6(2) is to be obtained. FIG. 7(1) shows storage addresses of image signals corresponding to 3,200 pixels in a main scan line X of the original shown in FIG. 6(1) in the line buffer A 306 or B 307. Note that in the original shown in FIG. 6(1), the image A starts at a 10-mm position from the reference point in the main scan direction, and ends at a 60-mm position therefrom, the image B ends at a 110-mm position, and the image C ends at a 160-mm position. The areas of the images in the main scan direction are discriminated by the CPU 204 in accordance with image area designation of the operator through the digitizer 139.

In order to obtain the print result shown in FIG. 6(2), a value "160" corresponding to the output start position "10 mm" of the image A is set in the left margin counter 324 shown in FIG. 5, a value "1761" as a storage start address of the image C is set in the start register 309, a value "2560" as a storage end address of the image C is set in the comparison data register 320, a value "161" as a storage start address of the image A is set in the reload register 310, a value "960" as a storage end address of the image A is set in the comparison data register 321, a value "961" as a storage start address of the image B is set in the reload register 311, and a value "2400" corresponding to an effective image length of 150 mm is set in the video clock counter 328. Note that the up/down signal set in the selector 315 is an up signal since no mirror image output is required.

When the BD signal is input from the printer during the image reading operation, the left margin counter 324 in which the value "160" is set starts counting of the video clock VCLK in response to the BD signal, as shown in FIG. 7(3).

The count-up signal CUS is output from the left margin counter 324 in response to a 160th clock of the video clock signal VCLK, as shown in FIG. 7(5). In response to this, the set value "1761" of the start register 309 is loaded to the address counter 308 through the load value selector 314. In response to the output of the count-up signal CUS, the video clock counter 328 sets the gate signal SGS at HIGH level, as shown in FIG. 7(7), and performs count-down from the set value "2400", as shown in FIG. 7(6), thereby allowing the gate 329 to pass the image signal. Thereafter, the address counter 308 performs count-up operation, as shown in FIG. 7(8), and image signals corresponding to the image C stored at addresses "1761", "1762", "1763", ... of the line buffer A 306 or B 307 are thus read out, as shown in FIG. 7(11).

When the count value has reached "2560", it coincides with the set value in the comparison data register 320, and the comparator 316 outputs the coincidence signal CES1, as shown in FIG. 7(9). Thus, the set value "161" in the reload register 310 is loaded to the address counter 308 through the load value selector 314.

The address counter 308 then performs the count-up operation from the value "161", and image signals corresponding to the image A stored at addresses "161", "162", "163", ... in the line buffer A 306 or B 307 are thus read out.

When the count value has reached "960", it coincides with the set value in the comparison data register 321, and the comparator 317 outputs the coincidence signal CES2, as shown in FIG. 7(10). The set value "961" in the reload register 311 is loaded to the address counter 308 through the load value selector 314. Thereafter, the address counter 308 performs a count-up operation, and thus, image signals corresponding to the image B stored at addresses "961", "962", "963", ... in the line buffer A 306 or B 307 are read out.

Thereafter, when the video clock counter 328 completes counting about 2,400 clocks, the gate signal SGS goes to LOW level, as shown in FIG. 7(7), thus inhibiting passage of the image signals through the gate 329.

As described above, the read order and read start and end timings of image signals corresponding to 3,200 pixels for one line stored in line buffer A 306 or B 307 are controlled, and an image signal VIDEO can be obtained as shown in FIG. 7(11). This processing is performed over a subscan range to be image-processed, so that the print result can be obtained by the printer, as shown in FIG. 6(2).

Figure 8:
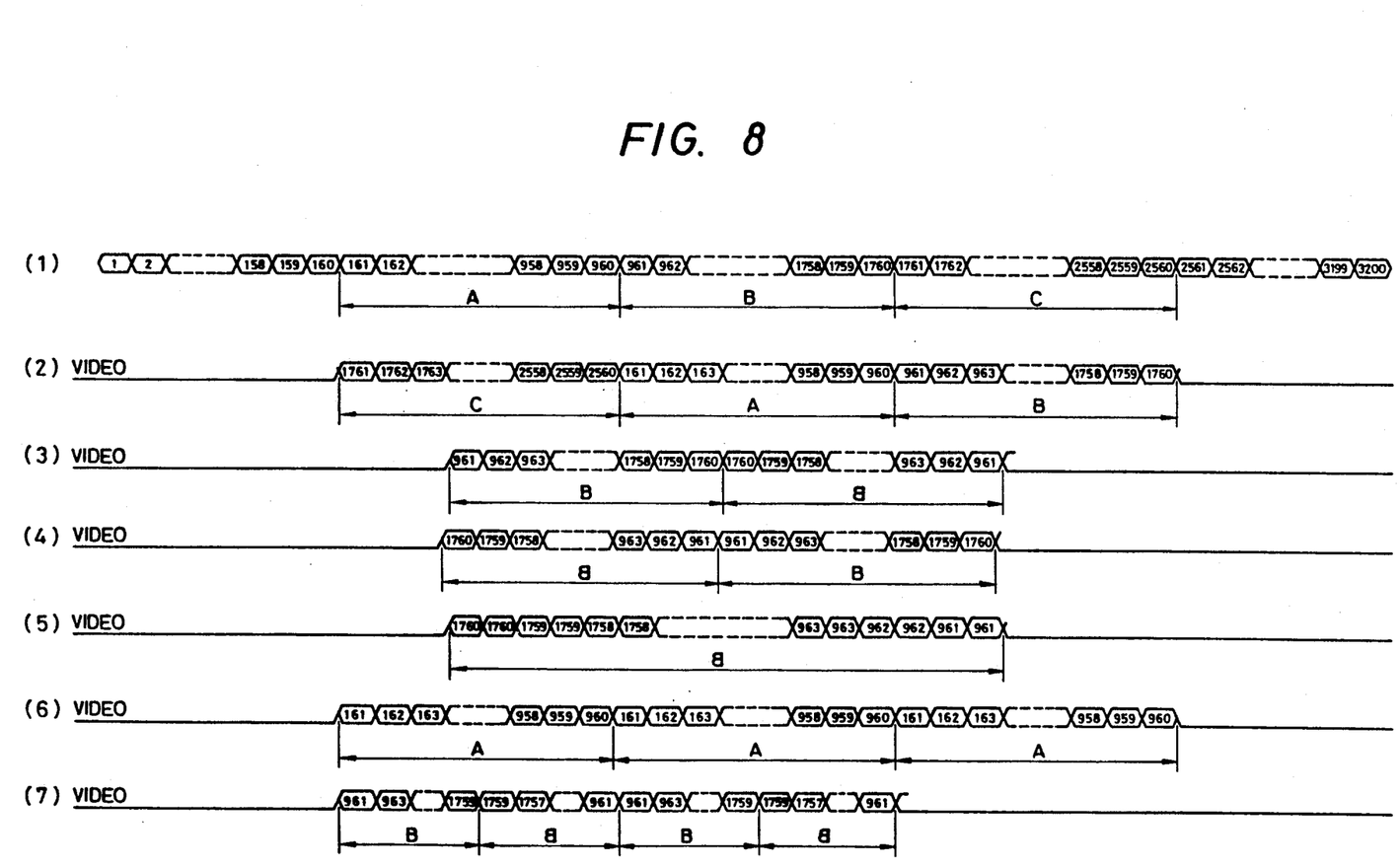

FIG. 8 shows an output state of the image signal VIDEO in the processing operations of FIG. 6. FIG. 8(1) shows storage addresses of image signals corresponding to 3,200 pixels in the main scan line X of the original shown in FIG. 6(1) in the line buffer A 306 or B 307 in the same manner as in FIG. 7(1). FIG. 8(2) shows the output image signal VIDEO when the print result shown in FIG. 6(2) is to be obtained in the same manner as in FIG. 7(11), and FIGS. 8(3) to 8(7) show output video signals VIDEO when print results shown in FIGS. 6(3) to 6(7) are to be obtained, respectively.

In the print result shown in FIG. 6(3), the image B of the original of FIG. 6(1) is symmetrically folded about a reference line RL. In this case, a value "480" is set in the left margin counter 324, a value "961" is set in the start register 309, a value "1760" is set in the comparison data register 320, a value "1760" is set in the reload register 310, and a value "1600" is set in the video clock counter 328. The up/down signal UD-ST of the selector 315 is set to be an up signal, and the signal UD1 is set to be a down signal for outputting a mirror image. Thus, the output image signal VIDEO shown in FIG. 8(3) is obtained.

In the print result shown in FIG. 6(4), the mirror image of the image B of the original of FIG. 6(1) is symmetrically folded about the reference line RL. In this case, a value "480" is set in the left margin counter 324, a value "1760" is set in the start register 309, a value "961" is set in the comparison data register 320, a value "961" is set in the reload register 310, and a value "1600" is set in the video clock counter 328. The up/-down signal UD-ST of the selector 315 is set to be a down signal, and the signal UD1 is set to be an up signal. Thus, the output image signal VIDEO shown in FIG. 8(4) is obtained.

In the print result shown in FIG. 6(5), the mirror image of the image B of the original of FIG. 6(1) is enlarged. In this case, a value "480" is set in the left margin counter 324, a value "1760" is set in the start register 309, and a value "1600" is set in the video clock counter 328. The up/down signal UD-ST of the selector 315 is set to be a down signal. Thus, the output image signal VIDEO shown in FIG. 8(5) is obtained.

The print result shown in FIG. 6(6) shows an example of an image repeat operation wherein the image A of the original of FIG. 6(1) is output three times. In this case, a value "160" is set in the left margin counter 324, a value "161" is set in the start register 309, a value "960" is set in the comparison data registers 320 and 321, a value "161" is set in the reload registers 310 and 311, and a value "2400" is set in the video clock counter 328. The up/down signals UD-ST, UD1, and UD2 of the selector 315 are set to be up signals. Thus, the output image signal VIDEO shown in FIG. 8(6) is obtained.

The print result shown in FIG. 6 (7) is obtained by combining the folding operation, the image repeat operation, and reduction of the image B of FIG. 6(1). In this case, a value "160" is set in the left margin counter 324, a value "961" is set in the start register 309, a value "1759" is set in the comparison data registers 320 and 322, a value "1759" is set in the reload registers 310 and 312, a value "961" is set in the comparison data registers 321 and 323, a value "961" is set in the reload register 311, and a value "1600" is set in the video clock counter 328. The up/down signals UD-ST and UD2 of the selector 315 are set to be up signals, and the signal UD1 and UD3 are set to be down signals. Thus, the output image signal VIDEO shown in FIG. 8(7) is obtained.

The setting operation of the processing modes will be described with reference to FIG. 9.

Figure 9A:
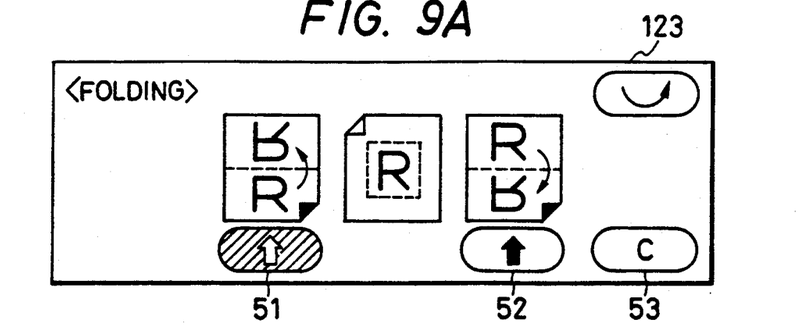
FIGS. 9A to 9D are view showing display state of the operation units.

When the folding key 137 on the editor 31 is depressed, the liquid crystal display 123 presents a display shown in FIG. 9(A), and folding processing is selected, thus indicating a folding direction. Key sections 51 and 52 displayed on the display 123 are folding direction selection keys, and the selected one (key section 51 in FIG. 9(A)) is indicated by a hollow arrow. A C key 53 is used to cancel the folding processing.

Figure 9B:
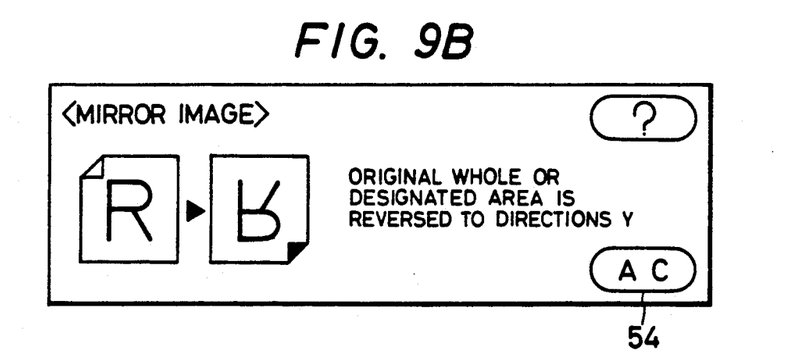

When the mirror image key 136 on the editor 31 is depressed, the liquid crystal display 123 presents a display shown in FIG. 9(B), and the mirror image function is selected. A key 54 is a clear key for canceling selection of the mirror image processing.

Figure 9C:
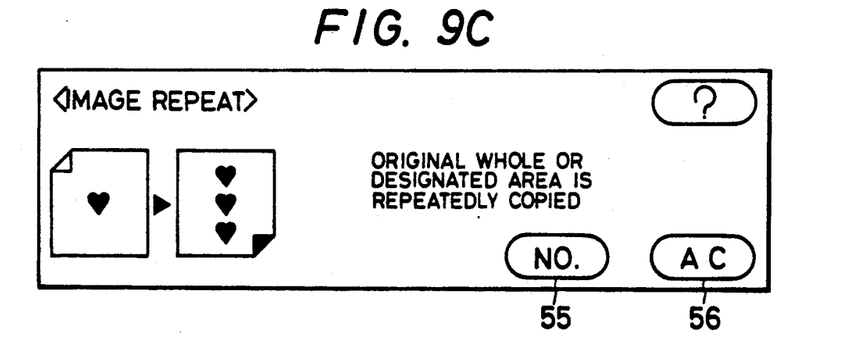
Figure 9D:
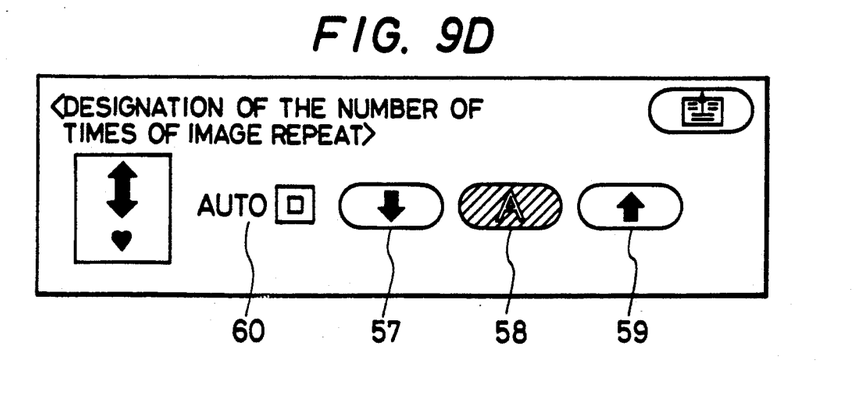

When the image repeat key 135 on the editor 31 is depressed, the liquid crystal display 123 presents a display shown in FIG. 9(C), and the image repeat mode is selected. A cancel key 56 is used for canceling the image repeat mode. When a No. key 55 is depressed, the liquid crystal display 123 presents a display shown in FIG. 9(D). In FIG. 9(D), keys 57 and 59 are used for incrementing/decrementing the number of times of image repeat. An auto key 58 is used for automatically setting the number of times (for copying an image as many as possible on a sheet). When the auto mode is selected, the key 58 display is reversed as shown in FIG. 9(D), and letters "AUTO" are displayed on a No. display 60. In the auto mode, the auto variable magnification mode and the auto paper selection mode of the operation section are automatically canceled. However, if these modes are again selected after the auto variable magnification mode and the auto paper selection mode are canceled, a warning message is displayed on the liquid crystal display 123. During auto designation, when the up/down keys 57 and 59 are depressed, a default value (2 in this embodiment) is displayed on the No. display 60.

The reordering of images shown in FIG. 6(2) can be designated by combining area designation and move designation modes. In this embodiment, when images at their destinations overlap each other, an area designated later is overwritten to absorb an input error of the coordinate input using the digitizer 139. Since image signals of a plurality of areas on an identical main scan line are simultaneously output, movement of images to different positions in the sub scan direction in units of areas is inhibited.

Figure 10:
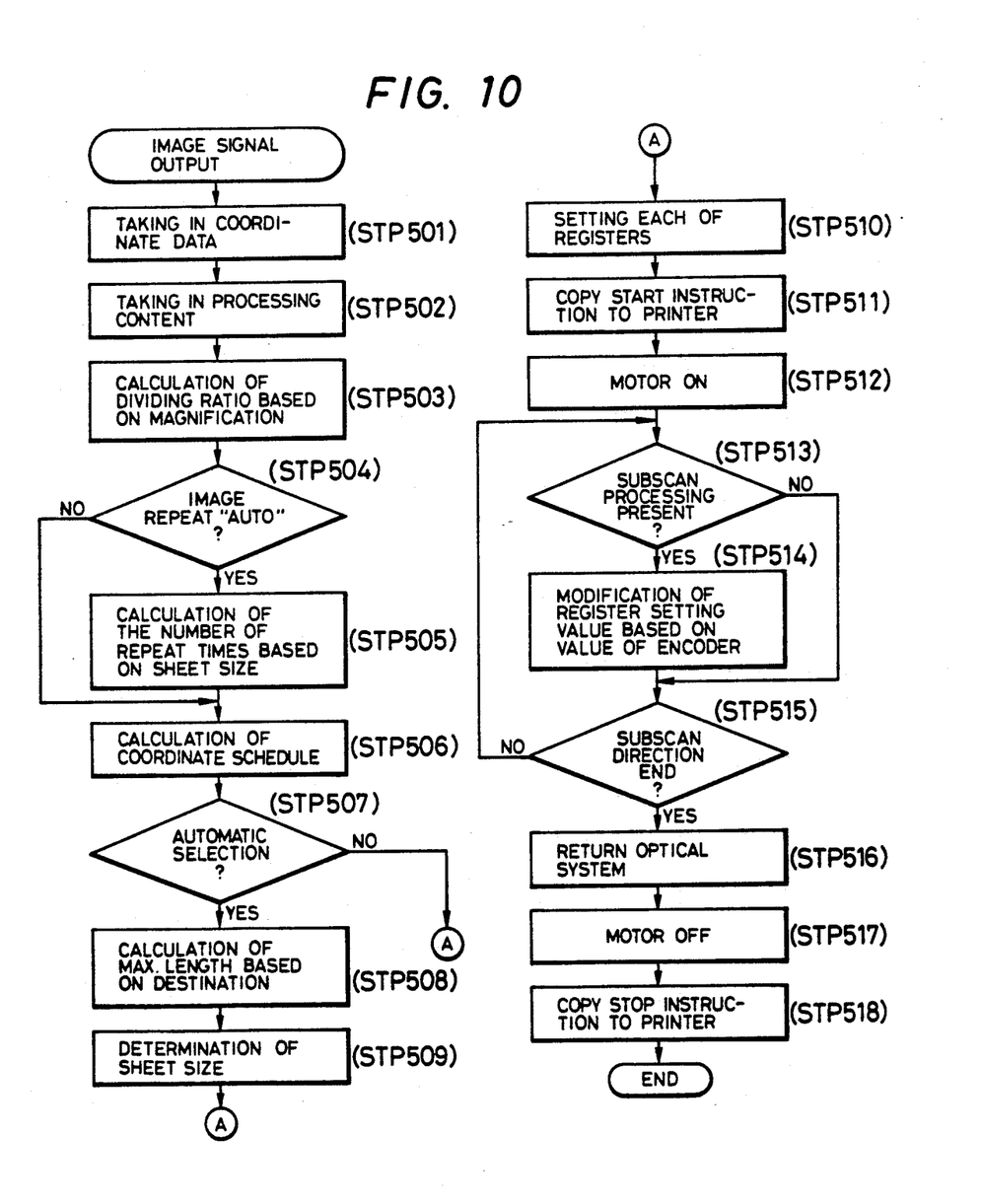
FIG. 10 is a flow chart showing control procedures.

FIG. 10 is a flow chart showing the operation of the image output mode of the CPU 204. The operation will be described below.

The CPU 204 takes in coordinate data of area designation or magnification designation by the touch pen 138 on the digitizer 139 (STP501), and takes in designated contents from the keys on the digitizer 139 or the operation section 143 (STP502).

As shown in FIG. 5, the frequencies of the clock RCLK input to the read out address counter 308 and the clock WCLK input to the write-in address counter 305 are changed in accordance with a magnification. Therefore, a frequency dividing ratio is calculated based on the magnification and is set in the frequency dividers 327 and 326 (STP503).

It is checked if the image repeat mode is selected. If it is determined that the image repeat mode is selected, it is checked if the auto mode is selected. If the auto mode is not selected, the number of repeat times set by the operator is made valid.

If the auto mode is selected (STP504), the number of repeat times is calculated so that images to be repeated fall in a designated sheet (STP505). Note that when the auto mode is selected, the auto paper selection and auto variable magnification modes (to be described later) are inhibited, and the paper selection and magnification selection by the operator are made valid. For example, if a designated size is an A4 size, the length in the main scan direction is 297 mm. Therefore, if the repeat designation area has a main scan length of 40 mm, the number of repeat times is determined to be 297/40=7. When the entire A4-sized original is reduced to 40% in the main scan direction to be copied on the A4-sized sheet based on the designation of the operator, the number of repeat times is determined to be 297/(297×0.4)=4. For example, when the output position to the sheet is designated by the move key, as shown in FIG. 6(6), the paper length from the designated position is divided by the area length to determine the number of repeat times.

A schedule calculation is performed depending on functions based on coordinate data (STP506).

The schedule calculation is a control procedure in the main and sub scan directions for realizing functions. For example, when a folded image shown in FIG. 6(3) is output to the center of a sheet, if the paper size is an A4 size, the length in the main scan direction is 297 mm. Since the length of the area of the image B in the main scan direction is 50 mm, if it is folded, the length is 100 mm. In this case, the magnification is 100%. However, if another magnification is selected, the magnification is multiplied with the area size, and calculation is then made based on this.

Therefore, each of left and right margins is 98.5 mm. Since the number of pixels is 16 pixels/mm, a value "1576" (=98.5×16) corresponding to the image output start position of 98.5 mm is set in the left margin counter.

A value "961" corresponding to the storage start address of the image B is set in the start register 309, a value "1760" corresponding to a storage end address of the image B in the comparison data register 320 and the reload register 310, and a value "1600" corresponding to 100 mm as an effective image length is set in the video clock counter 328. The up/down signal UD-ST of the selector 315 is set to be an up signal, the signal UD1 is set to be a down signal, and the signal UD2 is set to be an up signal. However, in this embodiment, since a complicated figure or a plurality of areas are also processed, these designated values are not immediately set in the registers but are temporarily set in the RAM 210. For example, if the designated area of the image output on the recording sheet shown in FIG. 6(3) falls within the range of 100 mm to 150 mm in the sub scan direction from the reference point, the optical system of the reader generates encoder pulses every 0.05 mm in this embodiment. Therefore, in the above case, in response to the 2,000th pulse count of the encoder pulses, the above register control can be started, and can be completed in response to the 3,000th pulse. The resultant value is also stored in the RAM 210 in the same manner as described above, and is utilized for processing for every encoder pulse (to be described later).

The calculation procedure when the result shown in FIG. 6(3) is to be output has been described. This applies to other cases, and the calculation is performed in consideration of the magnification and movement.

The printer as the output section of this system has a plurality of paper feed sections, and can simultaneously load paper of various sizes. Therefore, if the auto paper selection mode is selected (STP507), a maximum length is calculated based on the coordinate value and the magnification (STP508), and an optimal paper size is selected from those loaded in the printer based on the maximum length (STP509). Assuming that the printer loads the A4- and B5-size cassettes, if the image shown in FIG. 6(3) is output at a magnification of 100%, the main scan length of the folded image output area is 100 mm, and a sub scan length thereof is 50 mm. Therefore, the B5-sized sheet (main scan length=250 mm, sub scan length 176 mm) is selected upon comparison of calculations by the program. If the identical image is enlarged at a magnification of 270% and output the A4-sized sheet (main scan length=297 mm, sub scan length 210 mm) is selected.

Values necessary for image processing are set in the registers and counters shown in FIG. 5 (STP510), and a copy start instruction is output to the printer (STP511). The drive motor for moving the optical system from the home position in the sub scan direction is turned on (STP512). The encoder pulses synchronous with the movement of the optical system are counted. If the values in the registers must be modified in the sub scan direction (STP513), it is determined if the encoder pulse count has reached a corresponding value. If the count has reached, the necessary values of the registers are modified in accordance with the data set in the RAM 210 (STP514). In this manner, the original scan operation is performed, and when the read operation in the sub scan direction has reached an end of an original or sheet (STP515), the optical system is returned to the home position, and the motor is stopped (STP516, STP517). A copy stop instruction is then supplied to the printer (STP518).

As has been described above, at least an array of memories are provided, addresses are updated in accordance with a coincidence signal obtained upon comparison of addresses from the read out address counter, and its count direction is switched, so that image signals can be desirably reordered in the main scan direction. Thus, various image outputs can be obtained, as shown in FIG. 6.

Since the keys for designating these function, i.e., the folding, mirror image, image repeat modes, and the like, and the corresponding touch panel display screen are provided, the operator can easily use the various functions.

In the processing examples of this embodiment shown in FIG. 6, various processing functions are executed for a partial region of an original. As a matter of course, an image on the entire region of an original can be subjected to folding processing, image repeat processing, and the like in accordance with values set in the registers.

As has been described above, various processing functions can be easily executed for an original image, and can be instructed by simple operation.

The preferred embodiment of the present invention has been described. However, the present invention is not limited to this embodiment, and various changes and modifications may be made within the spirit and scope of the invention.

What is claimed is:

1. An image processing apparatus, comprising:
   input means for entering image data representing an original image on a line by line basis;
   memory means for storing the image data entered from said input means on a line unit basis, wherein said memory means is capable of storing at least a line of the image data;
   read out means for reading out the image data from said memory means on a line unit basis;
   recording means for recording an image on a recording medium on a line by line basis based on the image data read out from said memory means on a line unit basis;
   designation means for designating a plurality of arbitrary partial images of the original image and a plurality of arbitrary recording positions of the plurality of designated partial images on the recording medium; and
   control means for controlling the read out operation of said read out means;
   wherein said read out means is adapted independently to read out a plurality of sets of image data representing the plurality of designated partial images, respectively, and said control means controls the order of read out of the plurality of sets of image data by said read out means in accordance with the designated recording positions, so as to record the plurality of designated partial images on an identical recording medium in an arrangement different from that of the original image.

2. An apparatus according to claim 1, wherein said input means comprises reading means for reading the original image on a line by line basis and generating the image data.

3. An apparatus according to claim 1, wherein said control means is adapted to control the read-out address of said memory means.

4. An apparatus according to claim 1, further comprising:
   setting means for setting an arbitrary arrangement of the plurality of designated partial images on the recording medium.

5. An image processing apparatus comprising:
   input means for entering image data representing an original image on a line by line basis;
   memory means for storing the image data entered from said input means on a line unit basis;
   read out means for reading out the image data from said memory means on a line unit basis;
   recording means for recording an image on a recording medium on a line by line basis based on the image data read out from said memory means on a line unit basis;
   designation means for designating a plurality of arbitrary partial images of the original image; and
   control means for controlling the read out operation of said read out means, wherein said control means causes said read out means to read out at least a set of image data of a plurality of sets of image data representing the plurality of designated partial images respectively in the opposite order to the order of storage of the image data and read out other sets of image data in the same order as the order of storage of the image data so as to record a mirror image of at least a designated partial image of the plurality of designated partial images and other designated partial images on an identical recording medium.

6. An apparatus according to claim 5, wherein said memory means is capable of storing at least a line of the image data.

7. An apparatus according to claim 5, wherein said input means comprises reading means for reading the original image on a line by line basis and generating the image data.

8. An apparatus according to claim 5, wherein said control means is adapted to control the read-out address of said memory means.

9. An apparatus according to claim 5, wherein said designation means is adapted to designate arbitrary recording positions of the plurality of designated partial images on the recording medium.

* * * * *